US008452319B2

(12) United States Patent
Lee et al.

(10) Patent No.: US 8,452,319 B2
(45) Date of Patent: May 28, 2013

(54) AD-HOC WIRELESS COMMUNICATION METHOD USING SECTOR ANTENNA, RECOVERY METHOD IN AD-HOC WIRELESS COMMUNICATION AND AD-HOC WIRELESS COMMUNICATION SYSTEM

(75) Inventors: Kang Woo Lee, Daejeon (KR); Ju Derk Park, Daejeon (KR); Cheol Sig Pyo, Daejeon (KR); Sang Joon Park, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 12/904,589

(22) Filed: Oct. 14, 2010

(65) Prior Publication Data

US 2011/0092244 A1   Apr. 21, 2011

(30) Foreign Application Priority Data

Oct. 15, 2009  (KR) .................. 10-2009-0098324
Sep. 17, 2010  (KR) .................. 10-2010-0091885

(51) Int. Cl.
*H04W 52/04* (2009.01)

(52) U.S. Cl.
USPC .......... 455/522; 455/69; 455/575.7; 455/428; 455/562.1; 342/367

(58) Field of Classification Search
USPC ............ 455/69, 522, 13.4, 9, 10, 63.4, 67.11, 455/67.16, 115.1, 135, 121, 245.1, 226.3, 455/420, 562.1, 575.7, 428, 561; 342/367, 342/361; 370/328, 329, 331, 315
See application file for complete search history.

(56) References Cited

U.S. PATENT DOCUMENTS

| 7,652,624 | B2 * | 1/2010 | Li et al. ................... 342/367 |
| 8,280,583 | B2 * | 10/2012 | Stahlin et al. ............... 701/36 |
| 2009/0197646 | A1 * | 8/2009 | Tamura et al. ............. 455/561 |
| 2009/0316657 | A1 * | 12/2009 | Singh et al. ............... 370/331 |
| 2010/0103864 | A1 * | 4/2010 | Ulupinar et al. ............ 370/315 |
| 2010/0214991 | A1 * | 8/2010 | Luers ..................... 370/329 |

OTHER PUBLICATIONS

Tetsuro Ueda et al., "An Efficient MAC Protocol with Direction Finding Scheme in Wireless Ad Hoc Network using Directional Antenna", Jun. 2003, 233-236pp.

* cited by examiner

*Primary Examiner* — Tan Trinh
(74) *Attorney, Agent, or Firm* — Staas & Halsey LLP

(57) ABSTRACT

Provided are an ad-hoc wireless communication method using a sector antenna, a recovery method in ad-hoc wireless communication, and an ad-hoc wireless communication system. The ad-hoc wireless communication method using a sector antenna according to an exemplary embodiment of the present invention, includes: transmitting a requesting message for setting a communication link while changing transmission power to each sector of the sector antenna; receiving a response message corresponding to the requesting message from a receiving node of each sector; configuring a routing table for the transmission power for each sector based on the received response message; and transmitting data at the transmission power for each sector by referring to the routing table.

19 Claims, 5 Drawing Sheets

AD-HOC WIRELESS COMMUNICATION METHOD USING SECTOR ANTENNA, RECOVERY METHOD IN AD-HOC WIRELESS COMMUNICATION AND AD-HOC WIRELESS COMMUNICATION SYSTEM

CROSS-REFERENCE TO RELATED APPLICATIONS

This application claims priority under 35 U.S.C. §119 to Korean Patent Application No. 10-2009-0098324, filed on Oct. 15, 2009 and Korean Patent Application No. 10-2010-0091885, filed on Sep. 17, 2010, in the Korean Intellectual Property Office, the disclosures of which are incorporated herein by reference in its entirety.

TECHNICAL FIELD

The present invention relates to an ad-hoc wireless communication method using a sector antenna, a recovery method in ad-hoc wireless communication, and an ad-hoc wireless communication system

BACKGROUND

When intending to form a linear topology network using wireless transmission apparatuses operated in an ad-hoc manner, the wireless transmission apparatuses may be linearly disposed. The disposed wireless transmission apparatuses form communication links with peripheral wireless transmission apparatuses communicable in an ad-hoc manner, thereby configuring the entire network. In this configuration, when considering the characteristics of the linear topology network, if one communication link loses communication capability, data from any one side cannot be transferred to the other side, based on the node of the communication link, such that the entire network is not formed. Therefore, considering the case where the communication capability of the entire network is lost due to the communication capability loss of the specific node, a need exists for a network recovery function for reconfiguring a network other than a node losing the communication capability. To this end, the wireless transmission apparatuses are disposed so that the communication coverage of the wireless transmission apparatuses overlaps with each other.

The formation, operation, and recovery method of the initial network may be varied according to a kind of antenna used by the transmission apparatus. The antenna may be largely classified into an omni-directional antenna and a directional antenna according to a kind of antenna used up to now.

When forming and operating the linear topology network using the wireless transmission apparatus using the omni-directional antenna, the wireless transmission apparatuses should be densely disposed in consideration of the network recovery, as compared to the case of using the directional antenna. This increases costs of network configuration. In addition, in order to replace the communication range of the node losing the communication capability, the peripheral transmission apparatuses increase the transmission output to recover the network, thereby increasing the power consumption. Further, when the transmission is performed at higher power through the omni-directional antenna, the interference having an effect on other nodes is more increased.

When the linear topology network is formed by using the wireless transmission apparatus using the directional antenna and is operated, a separate synchronization process to synchronize directivity for transmission and reception between the transmission apparatus and the peripheral transmission apparatuses should be continuously performed during the network operation. This wastes the power of the transmission apparatus having a limited power and a operation power and increases the calculation load. Further, in the case of using a steerable directional antenna in order to find direction other than the direction defined at the early time of forming the network during the network recovery, it is not suitable for the transmission apparatus having a limited operation power and it is difficult to make the transmission apparatus small. Further, in the case of using a non-steerable directivity antenna the directivity cannot be physically steered, such that the network cannot be recovered

SUMMARY

An exemplary embodiment of the present invention provides an ad-hoc wireless communication method using a sector antenna, including: transmitting a requesting message for setting a communication link while changing transmission power to each sector of the sector antenna; receiving a response message corresponding to the requesting message from a receiving node of each sector; configuring a routing table for the transmission power for each sector based on the received response message; and transmitting data at the transmission power for each sector by referring to the routing table.

Another exemplary embodiment of the present invention provides an ad-hoc wireless communication method using a sector antenna, including: receiving a requesting message for setting a communication link from a transmitting node including a sector antenna; and transmitting a response message including information of a sector included in the requesting message and information of transmission power to the transmitting node, wherein the information of the sector is information relating to the sector to which the transmitting node transmits the requesting message through the sector antenna, and the information of the transmission power is information relating to the transmission power of the requesting message Yet another exemplary embodiment of the present invention provides a recovery method of an ad-hoc wireless network using a sector antenna, including: transmitting a requesting message for setting a communication link while changing transmission power for each sector of a sector antenna until the response message is received from a receiving node of each sector; and receiving the response message and determining transmission power of the requesting message corresponding to the received response message as transmission power of each sector.

Still another exemplary embodiment of the present invention provides an ad-hoc wireless communication system using a sector antenna, including: a first node including the sector antenna and transmitting a first requesting message while changing transmission power for each sector of the sector antenna until a first response message is received; and a second node transmitting the first response message corresponding to the first requesting message when the first requesting message is received, wherein the first node determines the transmission power of the first requesting message corresponding to the received first response message as the transmission power of each sector and sets communication link with the second node.

Other features and aspects will be apparent from the following detailed description, the drawings, and the claims.

DETAILED DESCRIPTION OF EMBODIMENTS

Figure 1A:
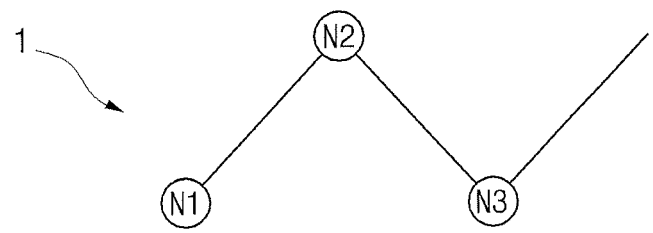
FIG. 1A is a conceptual diagram showing an ad-hoc wireless system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an ad-hoc wireless communication method and a wireless communication system according to an exemplary embodiment of the present invention will be described with reference to FIGS. 1A to 2. FIG. 1A is a conceptual diagram showing an ad-hoc wireless system according to an exemplary embodiment of the present invention, FIGS. 1B and 1C are conceptual diagrams for explaining the ad-hoc wireless communication method according to an exemplary embodiment of the present invention, and FIG. 2 is a flowchart for explaining the ad-hoc wireless communication method according to an exemplary embodiment of the present invention.

Referring to FIG. 1A, an ad-hoc wireless communication system 1 according to an exemplary embodiment of the present invention includes a plurality of nodes N1, N2, and N3. All of the plurality of nodes N1, N2, and N3 may include a sector antenna. The plurality of nodes N1, N2, and N3 sequentially set a communication link in order to form, for example, a linear topology network. For example, the first node N1 set the communication link with the second node N2 and then, the second node N2 sets the communication link with the third node N3. Hereinafter, a process of setting the communication link between the first node N1 and the second node N2 will be described in detail with reference to FIGS. 1B to 2. It is assumed that the sector antenna may be operated as N (=3) sectors.

Figure 1B:
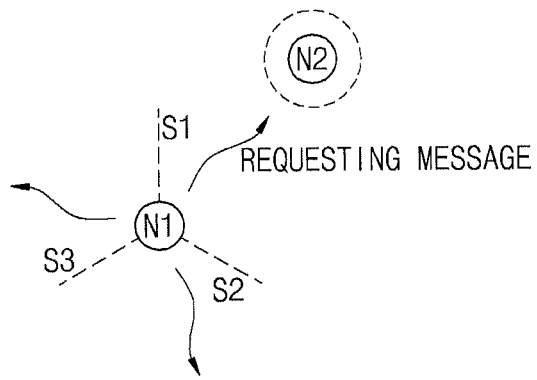
FIGS. 1B and 1C are conceptual diagrams for explaining the ad-hoc wireless communication method according to an exemplary embodiment of the present invention.
Figure 1C:
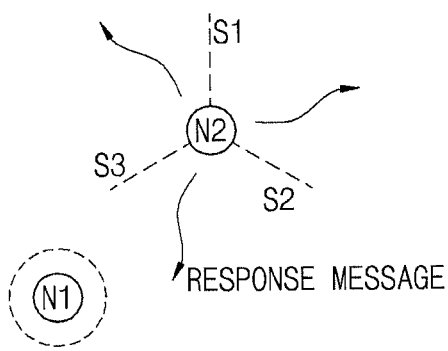
Figure 2:
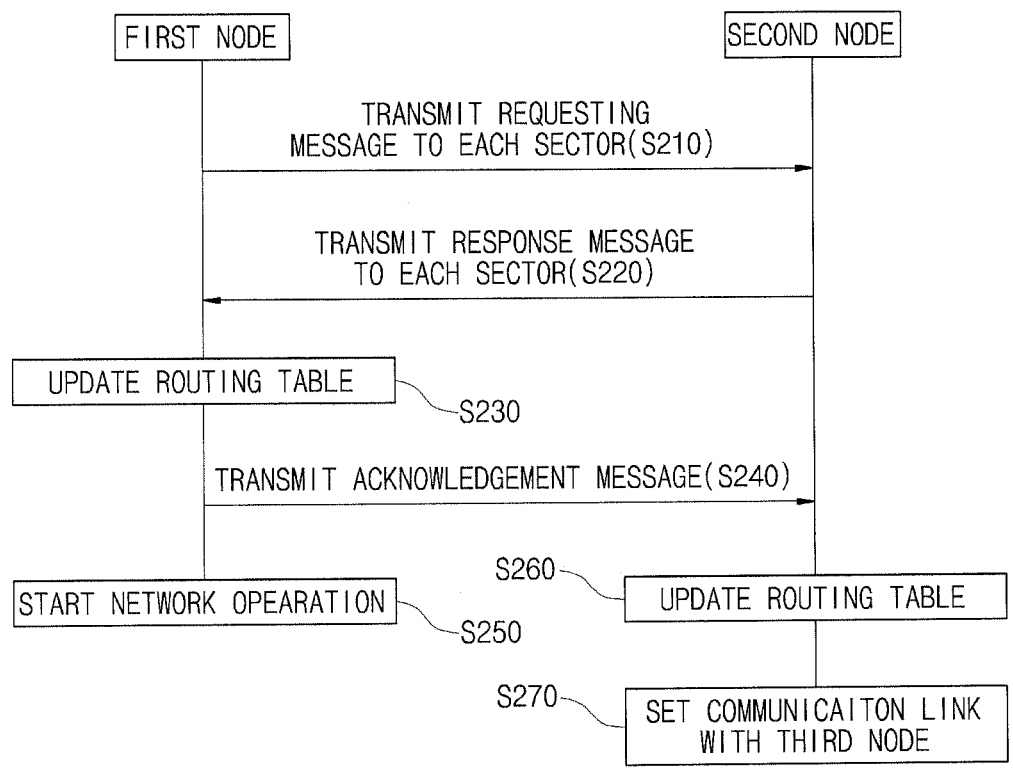
FIG. 2 is a flowchart for explaining the ad-hoc wireless communication method according to an exemplary embodiment of the present invention.

As shown in FIG. 1B, the first node N1 first becomes a transmission node to transmit a message required for setting the communication link to each sector S1, S2, and S3 of the sector antenna through the sector antenna. In this case, the first node N1 may transmit the requesting message at the minimum transmission power. Herein, the requesting message may include transmission power information as to whether the corresponding requesting message is output at some transmission power and sector information as to whether the requesting message is transmitted through n-th sector of the sector antenna.

In this case, the second node N2 may wait for the reception of the requesting message at the receiving mode. For example, the second node N2 may use an omni-directional antenna at the receiving mode to receive the requesting message. In order to divide the sector antenna and the omni-directional antenna, in the drawings, the upside Y is shown as a dotted line, which represents a sector antenna having three sectors S1, S2, and S3 and the omni-directional antenna is represented as a circular dotted line.

The second node N2 cannot know at which position of a node setting the communication link with the second node N2 exists, thereby waiting for the reception of the requesting message using the omni-directional antenna. In addition, the first node N1 transmits the requesting message and is converted into the receiving mode and may wait to receive the response message corresponding to the requesting message from the node receiving the requesting message by using the omni-directional antenna.

When the second node N2 receives the requesting message, it transmits the response message corresponding to the requesting message for N (e.g. N=3) sectors S1, S2, and S3 at the maximum transmission power. For example, the second node N2 may transmit the response message through the sector antenna as shown in FIG. 1C. Herein, the response message may include the transmission power information as to whether the corresponding response message is output at some transmission power, the sector information as to whether the response message is transmitted through n-th sector of the sector antenna, and information of the received requesting message (the transmission power information and sector information of the requesting message).

The first node N1 receiving the response message updates routing table information based on contents included in the response message. The routing table includes information, such as transmission power for each sector, whether or not to receive the response message, an address of the node N2 transmitting the response message, or the like. For example, the first node N1 may update the transmission power of the requesting message transmitted through the first sector S1 and the fact that the response message is received. When the routing table is configured as described above, the first node N1 may transmit data through the first sector S1 at specific transmission power by referring to the routing table at the time of operating the network later.

Meanwhile, when the first node N1 transmits the requesting message at the minimum transmission power and then, does not receive the response message corresponding thereto, the transmission power of the requesting message is increased, thereby making it possible to transmit the requesting message. That is, when the first node N1 does not receive the response message corresponding to the requesting message transmitted through each sector S1, S2, and S3, the transmission power to each sector S1, S2, and S3 is increased, thereby transmitting the requesting message. For example, when the requesting message is transmitted through all the sectors at the minimum transmission power and then, the response message is received only through the first sector S1, the first node N1 updates the information on the first sector S1 in the routing table and gradually increases the transmission power until the response message for other sectors S2 and S3 is received, thereby making it possible to transmit the requesting message. When the response message for any sector is received, the information on the corresponding sector is updated in the routing table. Through the process, the first node N1 may set the communication link at the lowest transmission power for each sector. That is, the first node N1 may determine the transmission power for each sector capable of minimizing power consumption through the above-mentioned process. When the process ends, the first node N1 starts the network operation. The operation of the first node N1 will be described in detail with reference to FIG. 3.

Meanwhile, the second node N2 receiving the response message transmits the response message while gradually reducing the transmission power from the maximum transmission power. The second node N2 transmits the response message while reducing the transmission power of the response message, until the acknowledgement message corresponding to the response message transmitted from the first node N1 is not received. When the acknowledgement message is received from the first node N1, the information on the transmission power is updated in the routing table. That is, the second node N2 determines the transmission power when the data or the message is transmitted to the first node N1.

The second node N2 becomes the receiving node to perform the same operation as the first node N1, in order to set the communication link with the other node, for example, third node N3.

Figure 3:
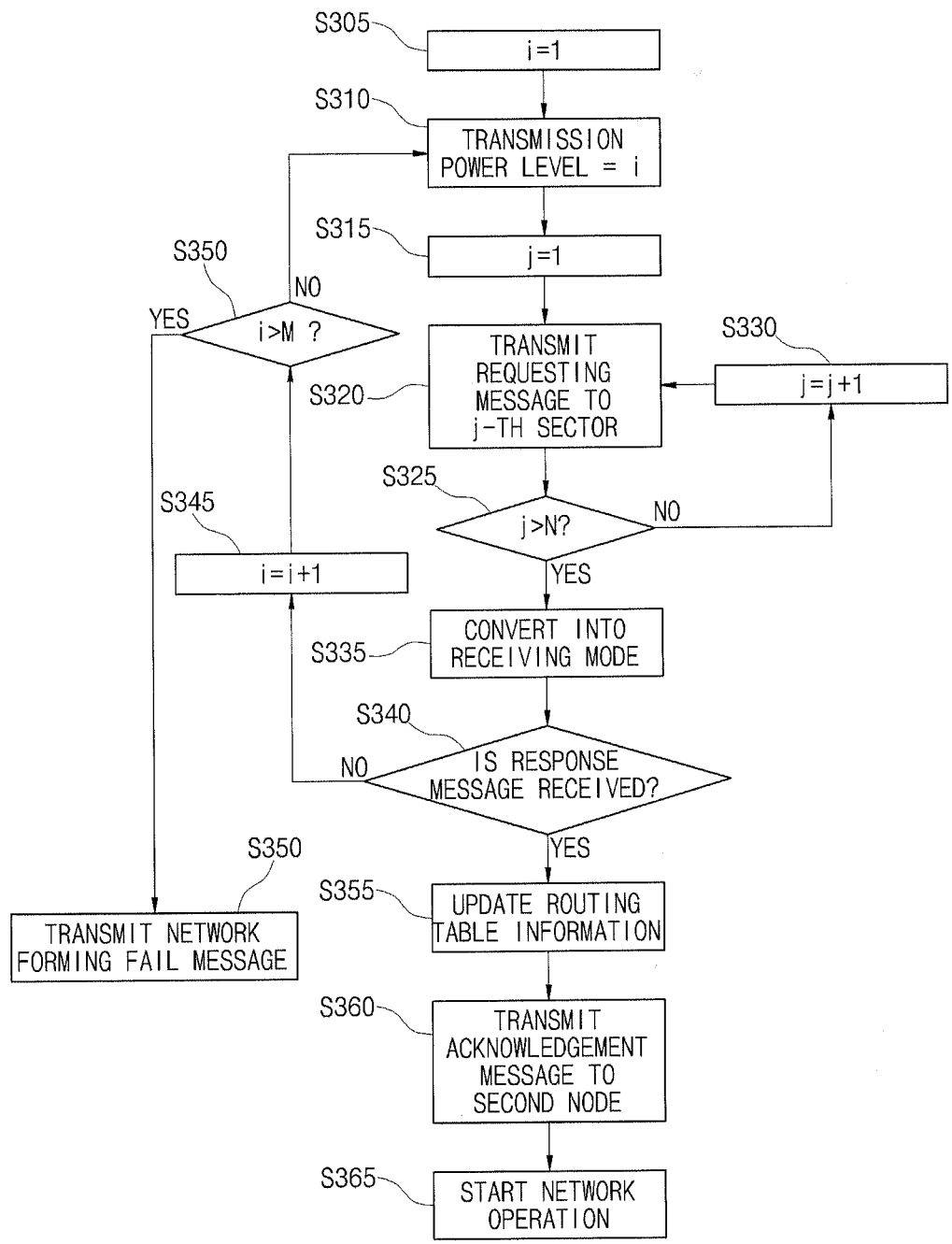
FIG. 3 is a flow chart for explaining an operation of a first node of FIG. 1.

The operation of the first node N1 will be described in detail with reference to FIG. 3. FIG. 3 is a flow chart for explaining the operation of the first node N1 of FIG. 1.

Referring to FIG. 3, the first node N1 sets variable i to 1 (S305) and sets the variable i to the level of the transmission power (S310). That is, the first node N1 sets the level of the transmission power to the lowest level 1. The first node N1 sets variable j to 1 (S315) and transmits the requesting message to a j-th sector among N sectors (S320). It is determined whether j is larger than the number of sectors N (S325). If not, the variable j is increased by 1 (S330) and the step S320 is performed.

If j is equal to larger than the number of sector N, the first node N1 is converted into the receiving mode (S335) and it is determined whether the response message is received (S340). For example, when the first node N1 waits as the receiving mode for a predetermined time and does not receive the response message for a predetermined time and the requesting message is received at the transmission power of i level, it is determined that the response message is not received.

When the first node N1 does not receive the response message, the level of the transmission power is increased by 1 (S345) and it is determined whether the level i of the transmission power is larger than the level M of the predetermined maximum transmission power that may be maximally output the first node N1 (S350). When i is not equal to or larger than M, i is again set to the transmission power level (S360) and subsequent steps are performed. If i is larger than M, it is determined to be a network forming fail and the network forming fail message is transmitted to a manager (S350). In other words, even when the first node N1 transmits the requesting message at the transmission power that can maximally output, it does not receive the response message, such that the first node N1 does not set the communication link to the sector.

When the first node N1 receives the response message, the information on the routing table is updated (S355). The first node N1 transmits the acknowledgement message to the second node N2 transmitting the response message (S360). The first node N1 starts the network operation (S365).

In the above-mentioned example, when the first node N1 transmits the requesting message of the specific transmission power and then receives the response message thereto, the transmission power is updated in the routing table immediately before the receiving time point and is determined as the transmission power of the corresponding sector at the time of operating the network later. That is, the requesting message may be transmitted while the transmission power is changed until the response message corresponding to the requesting message is received. However, the present invention is not limited thereto. For example, the requesting message may be transmitted while the transmission power is gradually increased from the minimum transmission power to the maximum transmission power for N sectors at the minimum transmission power and the response messages corresponding to each requesting message are received, such that the lowest transmission power may be determined as the transmission power of the corresponding sector by referring to the information on the transmission power of the requesting message included in the response messages.

Figure 4:
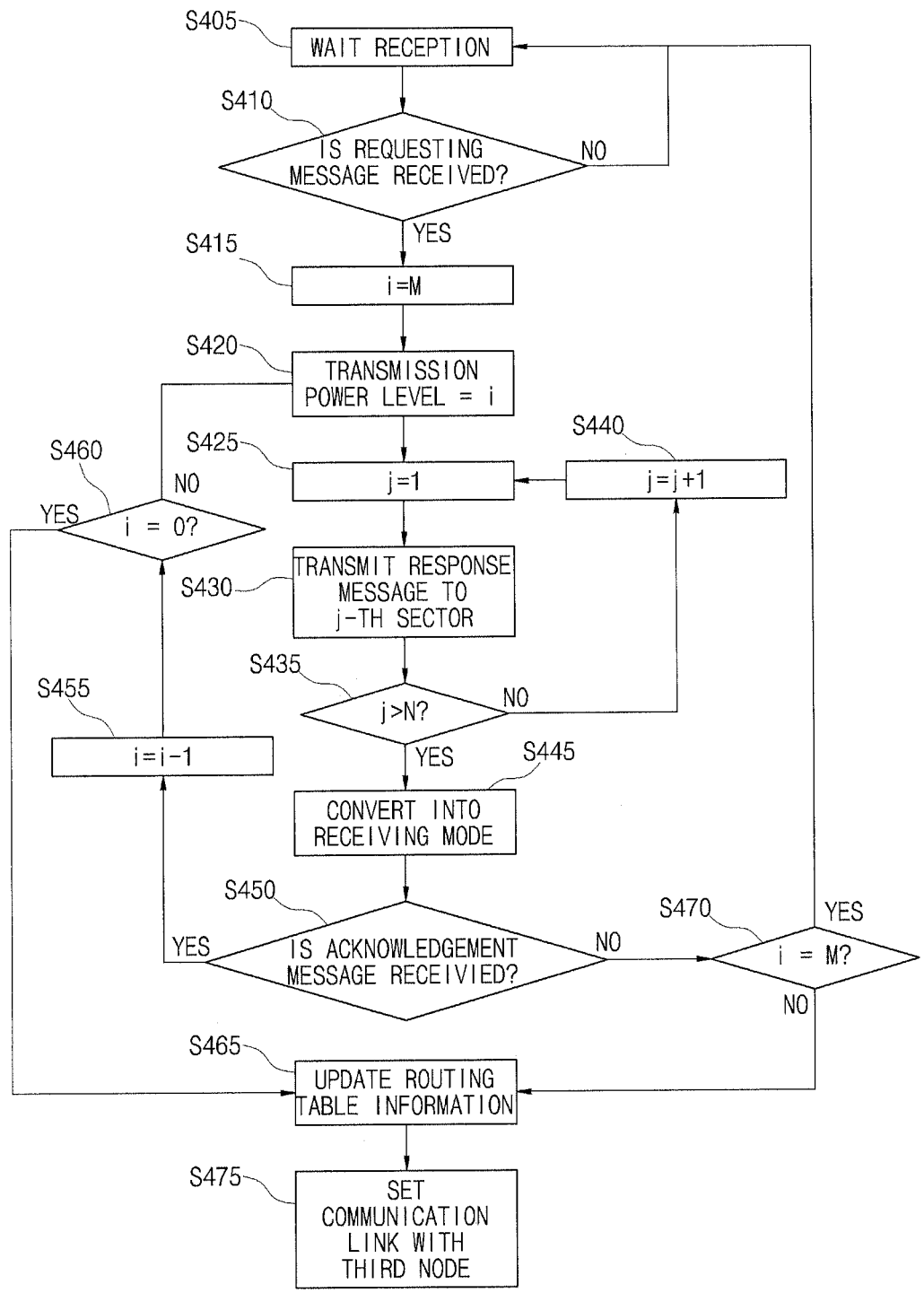
FIG. 4 is a flow chart for explaining an operation of a second node of FIG. 1.

The operation of the second node N2 will be described in detail with reference to FIG. 4. FIG. 4 is a flow chart for explaining the operation of the second node N2 of FIG. 1.

The second node N2 waits the reception of the requesting message (S405). For example, the second node N2 waits the reception of the requesting message using the omni-directional antenna. It is determined whether the requesting message is received (S410) and when the requesting message is not received, the reception continuously waits (S405). When the requesting message is received, the second node N2 sets variable i to the maximum transmission power level M that can be maximally output (S415) and sets i as the transmission power level (S420). The second node N2 sets the variable j to 1 (S425) and transmits the response message to a j-th sector (S430). The second node N2 determines whether j is larger than the number of sectors N (S435) and when j is equal to or smaller than N, variable j is increased by 1 (S440) and step S435 is performed again. That is, the second node N2 transmits the response message as the transmission power level of i for N sectors through steps S420 to S440.

When j is larger than N, that is, when the second node N2 transmits all the response message for N sectors, the second node N2 is converted into the receiving mode (S445) and it is determined whether the acknowledgement message corresponding to the response message is received (S450).

When the acknowledgment message is received, the variable i is reduced by 1 (S455) and it is determined whether i is 0 (S460). If it is determined that i is not 0, i is set as the transmission power level (S420) and steps S425 to S440 are performed. That is, when the acknowledgement message is received, the second node N2 lowers the transmission power level by one step and again transmits the response message to N sectors. If i is 0, that is, if the acknowledgment message is received from the first node N1 even when the response message is transmitted as the minimum transmission power level, the routing table information is updated (S465).

Meanwhile, when the acknowledgment message is not received, it is determined whether the variable i is M (S470) and if i is M, step S405 is performed. If i is not M, the information on the transmission power level and the sector is updated in the routing table (S465).

When the setting of communication link with the first node N1 is completed through the steps, the setting of communication link with the third node is performed (S475). The process of setting the communication link between the second node N2 and the third node is that the second node N2 performs the operation of the first node N1 as shown in FIG. 3. In this case, the third node performs the operation of the second node N2 as shown in FIG. 4.

In the above-mentioned example, the response message is transmitted while the transmission power is changed from the preset maximum transmission power to the preset minimum transmission power until the second node N2 receives the acknowledgement message from the first node N1. However, the present invention is not limited thereto. For example, the response message may be transmitted while the transmission power is gradually reduced from the maximum transmission power to the minimum transmission power for N sectors and the lowest transmission power is determined to be the transmission power of the corresponding sector by receiving the acknowledgement message and referring to the information on the transmission power of the response message included in the acknowledgment message. In this case, the acknowledgment message may include the information on the transmission power of the response message.

Figure 5:
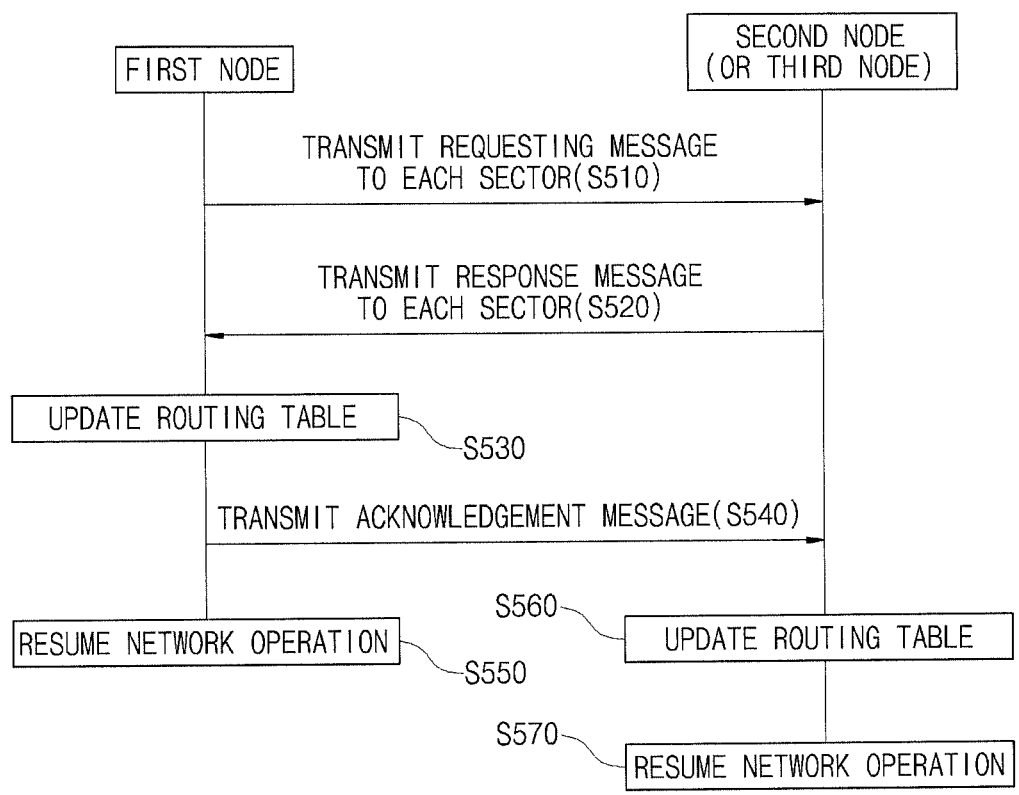
FIG. 5 is a flow chart showing a network recovery process according to an exemplary embodiment of the present invention.

Hereinafter, the network recovery process will be described with reference to FIG. 5. FIG. 5 is a flow chart showing a network recovery process according to an exemplary embodiment of the present invention.

Referring to FIG. 5, when communication is not performed due to the environmental factor of the communication link in one direction in the asymmetrical communication link between the first and second nodes N1 and N2, for example, in the asymmetrical communication link in which the transmission from the first node N1 to the second node N2 can be performed but the transmission from the second node N2 to the first node N1 cannot be performed, the first node N1 searches the link in which communication cannot be performed when the communication in a direction from the first node N1 to the second node N2 cannot be performed and attempts the network recovery. That is, the first node N1 attempts the network recovery using the method shown in FIG. 5. In this case, the link with the second node N2 may be again formed. Alternatively, new communication link with new third node N3 may be formed.

That is, the first node N1 transmits the requesting message to each sector (S510) and the second node N2 (or the third node) transmits the response message to each sector (S520). The first node N1 updates the information on the transmission power and the sector in the routing table (S530) and transmits the acknowledgment message (S540). The first node N1 resumes the network operation (S550). The second node N2 (or the third node) receives the acknowledgment message and then, updates the routing table (S560) and resumes the network operation (S570).

If the specific node loses the transmission capability due to the under power or the fault, for example, when the second node N2 loses the transmission capability, the first node N1 may form new communication link with the third node and the process of forming the new communication link may be performed in substantially the same manner as the process shown in FIG. 2.

According to the exemplary embodiments of the present invention, it is possible to reduce the calculation load at the time of forming the network and operate the network without the continuous loads such as time synchronization. Further, it is possible to minimize the stopping time of the network operation by rapidly recovering only the communication link region losing the communication capability at the time of the network recovery. In addition, it is possible to minimize the communication interference and the power consumption due to the network recovery by preventing the recovered communication link from interfering with the communication range of other transmission apparatuses.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An ad-hoc wireless communication method using a sector antenna, comprising:
    transmitting a requesting message for setting a communication link while changing transmission power to each sector of the sector antenna;
    receiving a response message corresponding to the requesting message from a receiving node of each sector;
    configuring a routing table for the transmission power for each sector based on the received response message; and
    transmitting data at the transmission power for each sector by referring to the routing table.

2. The method of claim 1, wherein the requesting message and the response message include information of the sector where the requesting message is transmitted and information of the transmission power, and
    the configuring of the routing table comprises configuring the routing table by using the information of the sector and the transmission power in the received response message.

3. The method of claim 1, wherein the transmitting of the requesting message comprises transmitting the requesting message while gradually increasing the transmission power from the preset minimum transmission power to the preset maximum transmission power until the response message is received.

4. The method of claim 3, wherein the configuring of the routing table comprises determining the transmission power of the transmitted requesting message as the transmission power for each sector immediately before the response message is received.

5. The method of claim 1, wherein the receiving of the response message comprises receiving the response message by using an omin-directional antenna.

6. An ad-hoc wireless communication method using a sector antenna, comprising:
    receiving a requesting message for setting a communication link from a transmitting node including a sector antenna; and
    transmitting a response message including information of a sector included in the requesting message and information of transmission power to the transmitting node,
    wherein the information of the sector is information relating to the sector to which the transmitting node transmits the requesting message through the sector antenna, and
    the information of the transmission power is information relating to the transmission power of the requesting message.

7. The method of claim 6, wherein the transmitting of the response message includes transmitting the response message while changing power of the response message until the acknowledgement message of the transmission node is received according to the transmission of the response message.

8. The method of claim 7, wherein the transmitting of the response message includes transmitting the response message while gradually reducing from the preset maximum transmission power to the preset minimum transmission power.

9. The method of claim 8, further comprising configuring a routing table using the power of the response message transmitted immediately before receiving the response of the transmitting node.

10. The method of claim 6, wherein after setting the communication link with the transmission node by receiving the response of the transmitting node according to the transmission of the response message, transmitting the requesting message by using the sector antenna in order to set the communication link with other adjacent receiving nodes.

11. The method of claim 6, wherein the receiving includes receiving the requesting message by using an omni-directional antenna.

12. A recovery method of an ad-hoc wireless network using a sector antenna, comprising:
   transmitting a requesting message for setting a communication link while changing transmission power for each sector of a sector antenna until the response message is received from a receiving node of each sector; and
   receiving the response message and determining transmission power of the requesting message corresponding to the received response message as transmission power of each sector.

13. The method of claim 12, wherein the transmitting of the requesting message includes:
   transmitting the requesting message at first transmission power within the preset maximum transmission power from the preset minimum transmission power;
   waiting the reception of the response message for a waiting time by converting into the receiving mode; and
   transmitting the requesting message at second transmission power higher than first transmission power within the range by converting into the transmission mode when the response message is not received for the waiting time.

14. The method of claim 13, wherein when the response message is received for the waiting time, the determining of the transmission power includes determining the first transmission power as transmission power of each sector.

15. The method of claim 13, wherein the waiting of the reception of the response message includes waiting the reception of the response message by using the omni-directional antenna by converting into the receiving mode.

16. The method of claim 12, wherein the requesting message includes information of the sector to which the requesting message is transmitted and information of the transmission power, and
   the response message includes information of the sector within the requesting message and information of the transmission power.

17. The method of claim 12, wherein the transmitting of the requesting message includes receiving the response message by using the omni-directional antenna.

18. An ad-hoc wireless communication system using a sector antenna, comprising:
   a first node including the sector antenna and transmitting a first requesting message while changing transmission power for each sector of the sector antenna until a first response message is received; and
   a second node transmitting the first response message corresponding to the first requesting message when the first requesting message is received,
   wherein the first node determines the transmission power of the first requesting message corresponding to the received first response message as the transmission power of each sector and sets communication link with the second node.

19. The system of claim 18, further comprising a third node receiving a second requesting message from the second node and transmitting a second response message corresponding to the second requesting message,
   wherein the second node includes the sector antenna and transmitting a second requesting message while changing transmission power for each sector of the sector antenna until the second response message is received.

* * * * *